United States Patent Office 3,502,919
Patented Mar. 24, 1970

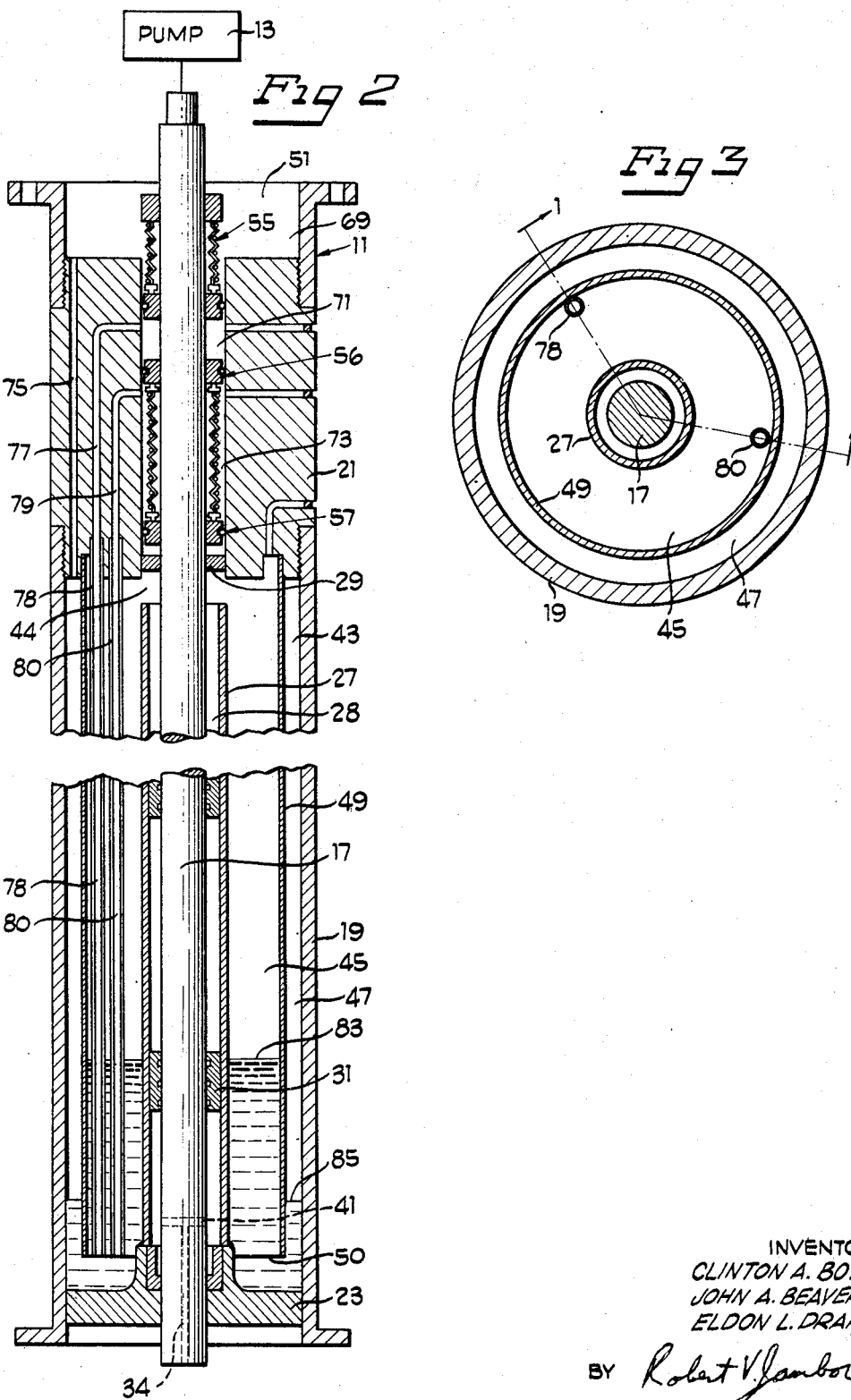

3,502,919
SUBMERSIBLE MOTOR SEAL SECTION
Clinton A. Boyd, John A. Beavers, and Eldon L. Drake, Tulsa, Okla., assignors to Borg-Warner Corporation, Chicago, Ill., a corporation of Delaware
Filed Jan. 2, 1969, Ser. No. 789,101
Int. Cl. H02k 5/10, 5/12
U.S. Cl. 310—87                           3 Claims

ABSTRACT OF THE DISCLOSURE

A seal section for a submersible pump motor filled with a lubricating and cooling fluid which seal section prevents ingress of ambient well fluid into the motor along an operating shaft and also accommodates expansion and contraction of the motor lubricating and cooling fluid volume due to on-and-off cycling of the motor. At least one rotary seal providing an essentially fluid-tight seal between the seal section housing and the shaft and a chamber having a radially inner portion and a radially outer portion in fluid communication adjacent the lower end of the chamber. The radially inner portion communicates with the motor adjacent the upper end of the chamber and the radially outer portion communicates with the ambient well fluid above the rotary seal adjacent the upper end of the chamber. An intermediate fluid is interposed between the ambient well fluid and the motor fluid filling at least a portion of the radially outer portion of the chamber and defining an interface with the ambient well fluid therein.

BACKGROUND OF THE INVENTION

This invention relates to submersible type seal sections for a submersible motor driving a submersible pump and in particular, is directed to a seal section for preventing communication between ambient well fluid and lubricating and cooling fluid contained within the motor.

There are many uses for submersible motor and pump units such as pumping fluid from deep oil or water wells. Generally, electric motors having these submersible motor and pump units are filled with a fluid which serves both as a coolant and as a lubricant for the moving parts of the motor. A seal section is interposed between the motor and pump for retaining this fluid within the motor and for preventing the ambient well fluid from entering the motor as well as accommodating volume changes in the motor fluid caused by on-and-off cycling.

Seal sections have been developed which include an elongated chamber in communication with the motor adjacent the top of the chamber and in communication with the well fluid through a conduit extending from adjacent the bottom of the chamber to the ambient well fluid present above the seal section. An intermediate fluid is provided within the chamber which fills a portion of the conduit communicating with the ambient well fluid. This intermediate fluid defines an interface with the ambient well fluid within the conduit and separates the ambient fluid from the motor cooling and lubricating fluid. A seal section of this type is disclosed and claimed in United States Patent No. 3,182,214 issued May 4, 1965, inventor, Clinton A. Boyd, and entitled "Submersible Motor Seal Section." The subject matter of this patent is expressly incorporated by reference herein.

It has been found that in seal sections of this type it is extremely critical to provide a sufficient fluid volume in the conduit communicating the lowermost portion of the chamber with the ambient well fluid present above the seal section. It is important that this volume be sufficient to prevent movement of the interface existing between the intermediate fluid and well fluid out of the conduit and into the chamber communicating with the motor fluid. This desired arrangement has been satisfactorily accomplished in prior structures covered by the above mentioned Patent No. 3,182,214, utilizing a relatively large tubular conduit or bundles of tubes, communicating between the lowermost portion of the chamber and the ambient well fluid. However, it is the principal object of the present invention to provide an improved arrangement for a submersible pump motor seal section which, in effect, eliminates the need for the tubular conduit, or bundles of tubes, and provides means insuring retention of the interface between the intermediate fluid and ambient well fluid within the portion of the seal section communicating between the ambient well fluid and the lowermost portion of the chamber.

SUMMARY OF THE INVENTION

Very generally, the seal section includes an elongated housing surrounding an operating shaft and at least one rotary seal providing an essentially fluid tight seal between the housing and the shaft adjacent the upper end of the seal section. The housing defines a chamber having a radially inner and a radially outer portion in fluid communication adjacent the bottom of the chamber. The radially inner portion communicates with the motor adjacent the uppermost portion of the chamber and the radially outer portion communicates with the ambient well fluid above the seal. An intermediate fluid fills a portion of the chamber including a portion of radially outer portion and separates the ambient well fluid and motor fluid. The volume of the radially outer portion of the chamber is such that the interface defined between the ambient well fluid and the motor fluid remains within the radially outer portion.

DESCRIPTION OF THE DRAWINGS

FIGURE 2 is a schematic view of the submersible pump motor seal section of FIGURE 1 with certain elements repositioned for clarity.

FIGURE 3 is a cross-sectional view of the submersible pump motor seal section of FIGURE 1 taken generally along the line 2—2 of FIGURE 1.

DETAILED DESCRIPTION

Figure 1:
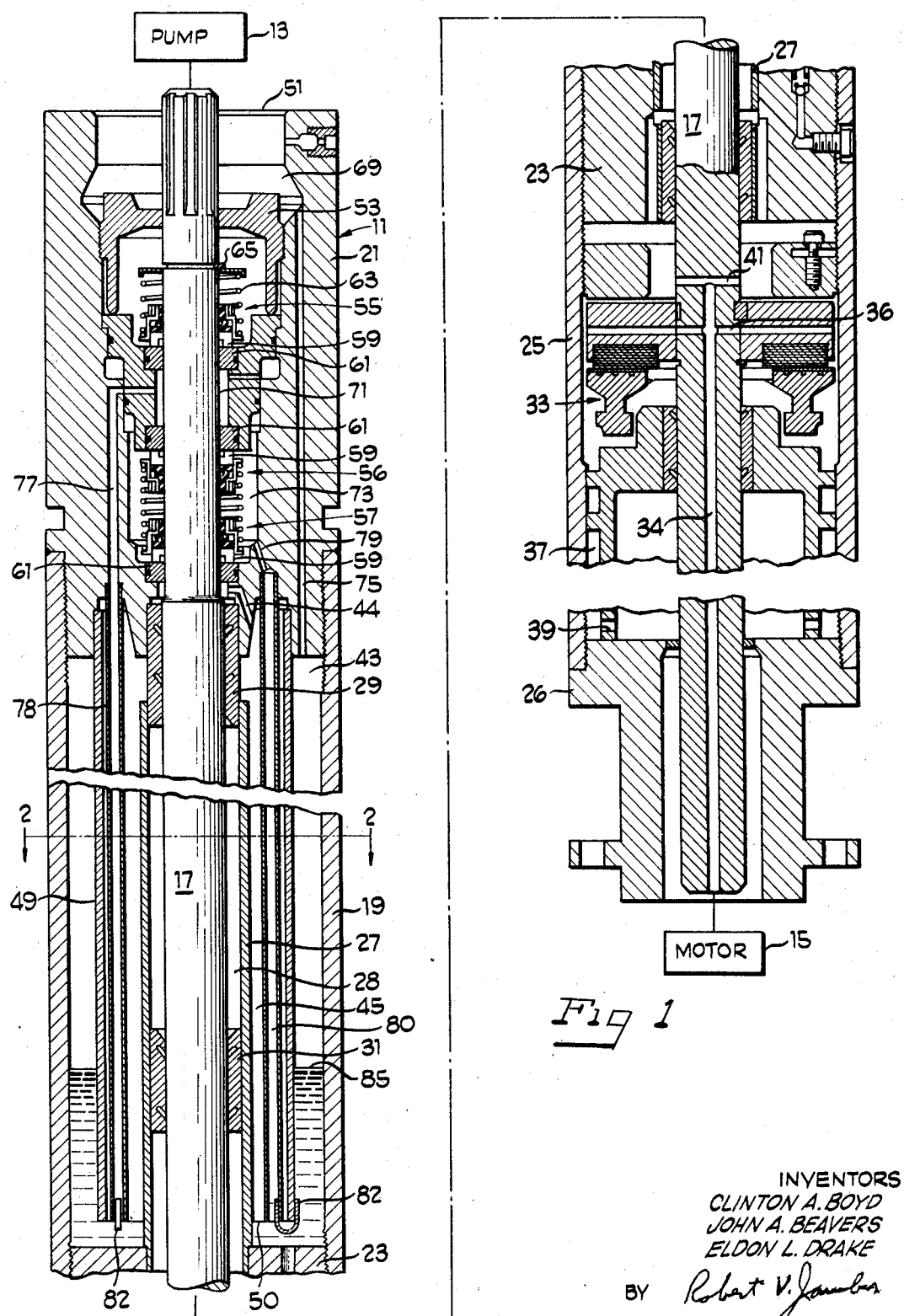
FIGURE 1 is a fragmentary sectional elevational view of a submersible pump motor seal section illustrative of the features of the present invention taken substantially along the line 1—1 of FIGURE 3.

Referring specifically to the drawings, there is illustrated a subbersible pump motor seal section generally designated 11 which is illustrative of the features of the present invention.

As illustrated, the seal section is disposed intermediate a submersible pump 13 and a submersible pump motor 15 which are drivingly connected by a common operating shaft 17 extending through the seal section. The seal section is adapted to prevent ingress of ambient well fluid along the operating shaft 17 into the pump motor 15 and accommodates volume changes of the motor cooling and lubricating oil due to temperature changes experienced by on-and-off cycling of the motor.

The seal section 11 includes a tubular housing 19 having its upper end connected to a seal retainer 21 and a lower end connected to a partition member 23. A second tubular housing 25 extends from the partition member 23 and is secured to a connector head 26. These members are all axially aligned in surrounding relation to the shaft 17 and connected in essentially fluid tight relation by any convenient method of fastening such as the illustrated threaded arrangement or by welding or the like.

A support tube 27 having an internal diameter larger than the diameter of the operating shaft 17 is disposed in surrounding relation to the shaft and defines an annular passage 28. The tube 27 is supported at its lower end in the partition member 23. It is supported at its upper end by a journal bearing 29 secured to the seal retainer 21. In addition, a plurality of sleeve type journal bearings 31 are disposed along the shaft which are affixed to the support tube 27 and serve to rotatably support the shaft 17.

The second tubular housing 25 includes a thrust bearing assembly generally designated 33 which serves to rotatably support the shaft 17 against axial thrust and, in addition, provides for circulation of lubricating and cooling fluid associated with the motor 15. In this regard, the shaft 17 is provided with an axial internal bore 34 which communicates with the fluid present in the motor 15.

The passage 34 communicates, in turn, with a lateral passage 36 in the thrust bearing assembly 33. Lubricating and cooling fluid passes from the motor through the passage 34 and radially outwardly through the passage 36 to the inner surface of the second tubular housing 25. The fluid then passes downwardly along the inner surface of the tubular member 25 through spiral grooves 37. The circulated fluid then passes radially inwardly through ports 39 and passes downwardly between the shaft and the connector head 26 and returns to the motor. Since the outer peripheral surface of the tubular housing is exposed to ambient well fluid, and the inner surface of the tube is exposed to the circulated motor fluid, heat transfer occurs through the tubular member and generated motor heat is dissipated to the well.

A second lateral passage 41 is provided in the shaft to allow motor fluid to pass from the axial internal bore 34 to the annular passage 28 defined by the shaft and support tube 27. The sleeve type journal bearings 29 and 31 include appropriately formed grooves which allow free passage of motor fluid along the shaft within the annular passage 28. The outer surface of the support tube 27 and the inner surface of the tubular housing 19 define an elongated annular chamber 43 having an upper end defined by the seal retainer 21 and a lower end defined by the partition member 23.

A passage 44 provides communication between the annular passage 28 and the chamber 43 at the upper end of the chamber. Therefore, the chamber 43 is in direct fluid communication with the motor 10 through the annular passage 28, lateral passage 41, and axial internal bore 34. In this manner, any expansion of motor fluid experienced due to increased temperature of the fluid will cause movement of the fluid upwardly through the annular passage 28 into the chamber 43. Conversely, any contraction of the motor fluid due to a reduction in motor fluid temperature will cause movement of motor fluid from the chamber 43 downwardly through the annular passage 28 to the motor.

The chamber 43 is divided into a radially inner portion 45 and a radially outer portion 47 by a tubular member 49 disposed concentrically of the tubular housing 19 and support tube 27. Tubular member 49 is secured to a seal retainer 21 and extends downwardly and terminates in an open lower end 50 adjacent the partition member 23 in closely spaced relation thereto. As can be seen therefore, the annular passage 28 is in communication with the radially inner portion 45 of the chamber 43 through the passage 44. The radially inner and radially outer portions of the chamber 43 are in communication with each other intermediate the open lower end of the tubular member 49 and the partition member 23.

An open upper end 51 of the seal retainer 21 is connected to the pump by means (not shown) and in addition is in direct communication with the ambient well fluid. A sand cap 53 is provided which surrounds the shaft and prevents ingress of particulate contaminants along the shaft 17.

A plurality of rotary seals generally designated 55, 56, and 57 are provided within the seal retainer 21. They are disposed in surrounding relation to the shaft and provide an essentially fluid tight seal between the rotating shaft 17 and the non-rotating seal section 11.

Each of the seals 55, 56, and 57 includes a rotating seal member 59 which includes a radially directed sealing surface which is in relatively rotating sealing engagement with a cooperating stationary sealing member 61. The seal member 59 of the seal assembly 55 is resiliently urged toward the stationary seal member 61 by a compressed coil spring 63 extending between the rotating seal member 59 and a snap ring 65 associated with the shaft 17. The rotating seals 56 and 57 face in opposite axial directions and therefore a single coil spring 67 is compressed between the seal members 59 and resiliently urges each of them into sealing engagement with the associated stationary sealing ring 61. The rotating sealing members 59 of each seal assembly fit tightly against the shaft 17 and provide an essentially fluid tight seal therebetween. Similarly the stationary sealing rings 61 are sealed with respect to the seal retainer 21 by O ring seals. By this arrangement ambient well fluid is effectively separated from the motor 15 and is precluded from passing along the shaft 17.

The rotary seals 55, 56, and 57 effectively form three separate chambers surrounding the shaft 17 within the seal retainer 21. The first of these chambers, designated 69 is formed above the uppermost seal 55 between that seal and the open end 51 of the retainer. It is therefore open to ambient well fluid.

The second chamber designated 71 is formed between the seals 55 and 56. The third chamber designated 73 is formed between the seals 56 and 57. It is noted that the annular passage 28, formed by the shaft 17 and support tube 27, is in communication with the lower side of the lowermost rotary seal 57.

A bore 75 in the seal retainer 21 defines a conduit communicating between the chamber 69 and the upper end of the radially outer portion 47 of the chamber 43. A bore 77 formed in the retainer 21 communicates with the chamber 71 formed between the seals 55 and 56. A tube 78 is secured to the seal retainer 21 in communication with the bore 77 and extends downwardly through the radially inner portion 45 of the chamber 43 and terminates in an open lower end aligned with the open lower end 50 of the tubular member 49. Similarly, a bore 79 was provided in seal retainer 21 which is in communication with the chamber 73 formed between the seals 56 and 57. A tube 80 is secured to the seal retainer 21 in communication with the bore 79 and extends downwardly through the radially inner portion 45 of the chamber 43, terminating in an open lower end axially aligned with the open lower end 50 of the tubular member 49. Clips 82 are connected between the open ends of the tubes 78 and 80 and the open end 50 of the tubular member 49 and retain the elongated tubes in position.

As can be seen, the tubes 78 and 80 which communicate with the chambers 71 and 73, have a cross-sectional area which is substantially smaller than the cross-sectional area of the radially outer portion 47 of the chamber 43 which, in effect, defines a conduit in fluid communication with the uppermost chamber 69 through the bore 75. It is only necessary that the tubes 78 and 80 be large enough to allow the passage of fluid.

At assembly, the entire submersible pump motor seal section 11 is filled with fluid. This is accomplished by connecting the seal section 11 with the motor 15 and filling both units with fluid through a filler port (not shown) in the motor. The fluid passes into the seal section 11 through the axial internal bore 34, lateral passage 41, and annular passage 28. A vent port (not shown) in communication with the chamber 43 is provided in the seal retainer 21 which accommodates venting of the chamber as the unit is filled.

After the motor and seal section are filled with the fluid which is motor lubricating and cooling oil, an intermediate fluid is introduced into the lower end of the chamber 43 through a check valve and filler port formed in the partition member 23. The intermediate fluid has a higher specific gravity than the previously introduced motor fluid and will, therefore, tend to fill the lower end of the chamber 43. Prior to introducing the intermediate fluid, the vent port in the seal retainer is closed. Therefore, introduction of the intermediate fluid causes displacement of some motor fluid upwardly in the radially outer portion 47 and through the bore 75 and out the open end 51 of the seal retainer 21.

The selected intermediate fluid is relatively non-soluble in the motor fluid and due to the difference in specific gravity, an interface 83 is formed between the motor fluid and the intermediate fluid. Continued introduction of the intermediate fluid causes the interface 83 to rise in the chamber to the open lower end 50 of the tubular member 49. At this point, the intermediate fluid will begin to be urged upwardly only in the radially outer portion 47 of the chamber 43 and no intermediate fluid will enter the radially inner portion 45. Introduction of the intermediate fluid is continued until it completely fills the radially outer portion 47, bore 75, and chamber 69.

The motor fluid may be of any suitable type having the desired lubricating and cooling characteristics. The intermediate fluid may also be of any suitable type and should preferably have a specific gravity greater than the selected motor fluid and be substantially non-soluble in the motor fluid in order to define the interface between the motor fluid and intermediate fluid. Further, the intermediate fluid should, in most applications, have a higher specific than the well fluid being pumped by the motor and pump unit. It has been found that oil is a satisfactory motor fluid and that for the majority of applications, water is a satisfactory intermediate fluid.

As the motor 15, pump 13 and seal section 11 are lowered into the well, there is, generally speaking, an increase in temperature due to the higher ambient temperature experienced at the bottom of the well. This increase in temperature causes expansion of motor fluid within the motor 15 as well as expansion of the motor fluid and intermediate fluid within the seal section 11. The fluid expansion causes fluid to be discharged outwardly through the radially outer portion 47, bore 75, chamber 69, and the open end 51. As expansion continues, motor fluid present in the radially inner portion of the chamber 43 will attempt to urge the interface between the motor fluid and intermediate fluid downwardly below the open lower end 50 of the tubular member 49. Because of the difference in specific gravity between the two fluids, motor fluid will be caused to rise through the intermediate fluid and upwardly in the radially outer portion of the chamber 43 through the bore 75, chamber 69, and out the open upper end 51. When the motor and seal section temperature reach equilibrium in the ambient environment, expansion of the oil stabilizes and discharge of oil will cease. The interface 83 will be virtually aligned with the open lower end 50 of the tubular member 49.

When the motor is operated, there will be an additional increase in temperature causing further expansion of the motor fluid. Again, the motor fluid will rise through the radially outer portion of the chamber and through the intermediate fluid and out the upper end 51. When the operating motor and seal assembly have reached the maximum operating temperature, further discharge of the motor fluid will cease and again, the interface 83 will be aligned with the open lower end 50 of the tubular member 49.

When the motor is shut down, the temperature of the fluids within the motor and seal section will drop to approximately the temperature of the well fluid and there will be a reduction in volume of the fluids. As illustrated in FIGURE 2, which is a schematic representation of the seal section of FIGURE 1, reduction in volume will cause motor fluid to move downwardly in the annular passage 28. A corresponding upward movement of motor fluid will be experienced in the radially inner portion 45 of the chamber 43. This, in turn, will cause upward movement of the interface 83 between the motor fluid and the intermediate fluid into the radially inner portion 45. Well fluid will then enter the open upper end 51 of the chamber 69 and travel downward through the bore 75 into a radially outer portion 47 of the chamber 43 and will form an interface 85 with the intermediate fluid. Subsequent on-and-off cycling of the motor 15 will cause the interface 85 to move upwardly and downwardly within the radially outer portion 47 of the chamber 43. At the same time, he interface 83 between the motor fluid and intermediate fluid will move upwardly and downwardly within the adially inner portion 45 of the chamber 43.

The volume of the radially outer portion 45 is such hat sufficient intermediate fluid is retained in the radially outer portion to prevent movement of the interface 85 into the radially inner portion 45 of the chamber 43 during off cycles of the motor. Also, volume of the radially nner portion 45 is sufficiently large to prevent movement of the interface 83 into the annular passage 28 during off cycles of the motor.

In the embodiment illustrated, the volume of the radially inner and radially outer portions of the chamber 43 are approximately equal. While this is a satisfactory arrangement, it is only necessary that the volumes be arge enough to insure retention of the interface 85 in the radially outer portion and retention of the interface 83 in the radially inner portion 45 during off cycles of the motor.

Three rotary seals 55, 56, and 57 are illustrated which define with the seal retainer 21, chambers 69, 71, and 73 which communicate with the intermediate fluid or ambient well fluid, as the case may be, through the passages 75, 77, and 79. Should failure of one or more of the seals occur, ingress of ambient well fluid is precluded n the manner clearly described in the previously mentioned United States Patent No. 3,182,214.

As can be seen, a submersible pump motor seal section has been provided which effectively prevents ingress of ambient well fluid into the motor along the operating shaft and accommodates expansion and contraction of the motor lubricating and cooling fluid and which further insures the establishment and retention of an interface between the intermediate fluid and ambient well fluid for prolonged periods of operation.

Various features of the invention have been particularly shown and described; however, it must be understood that these particular arrangements are merely illustrative.

What is claimed is:

1. A submersible pump motor seal section which prevents the ingress of ambient well fluid into the motor along an operating shaft and accommodates expansion and contraction of lubricating and cooling fluid in the motor occasioned by temperature changes of the fluid due to on-and-off cycling; said seal section including an elongated housing surrounding the operating shaft, at least one rotary seal providing an essentially fluid tight seal between said housing and the shaft, said housing defining a chamber having a lower end and an upper end adjacent said seal, said chamber further including a radially inner portion and a radially outer portion which are in fluid communication adjacent said lower end of said chamber, said radially inner portion containing motor fluid and being in communication with the motor adjacent said upper end of said chamber, said radially outer portion being open adjacent said upper end of said chamber to ambient well fluid present above said rotary seal and an intermediate fluid within said chamber separating said motor fluid and said ambient well fluid, said intermediate fluid filling a portion of said radially outer portion of said chamber and defining an interface with said ambient well fluid therein, the volume of intermediate fluid in said radially outer portion being sufficient to prevent movement of said interface from said radially outer portion into said radially inner portion upon contraction of said motor fluid during off cycles of said motor.

2. A submersible pump motor seal section as claimed in claim 1 wherein said chamber is divided into said radially inner and radially outer portions by a tubular member disposed concentrially of said housing and said shaft, said tubular member including an open lower end disposed adjacent said lower end of said chamber in spaced relation thereto.

3. A submersible pump motor seal section as claimed in claim 1 wherein the volume of said radially inner portion of said chamber and said radially outer portion of said chamber are essentially equal.

References Cited

UNITED STATES PATENTS

| | | | |
|---|---|---|---|
| 2,951,165 | 8/1960 | Arutunoff | 310—87 X |
| 3,153,160 | 10/1964 | Carle | 310—87 |
| 3,182,214 | 5/1965 | Boyd | 310—87 |
| 3,242,360 | 3/1966 | Carle | 310—87 |

WARREN E. RAY, Primary Examiner